T. C. VAUGHN.
GRAIN SEPARATOR.
APPLICATION FILED JUNE 23, 1919.
1,325,219.
Patented Dec. 16, 1919.
3 SHEETS—SHEET 3.
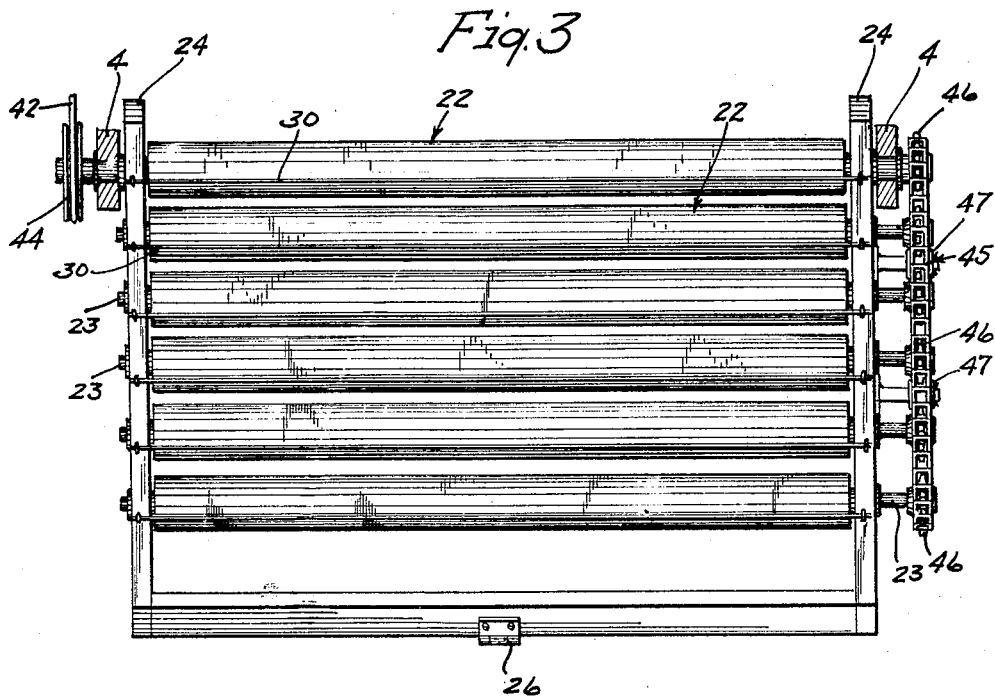
INVENTOR
Timothy C. Vaughn
BY HIS ATTORNEYS

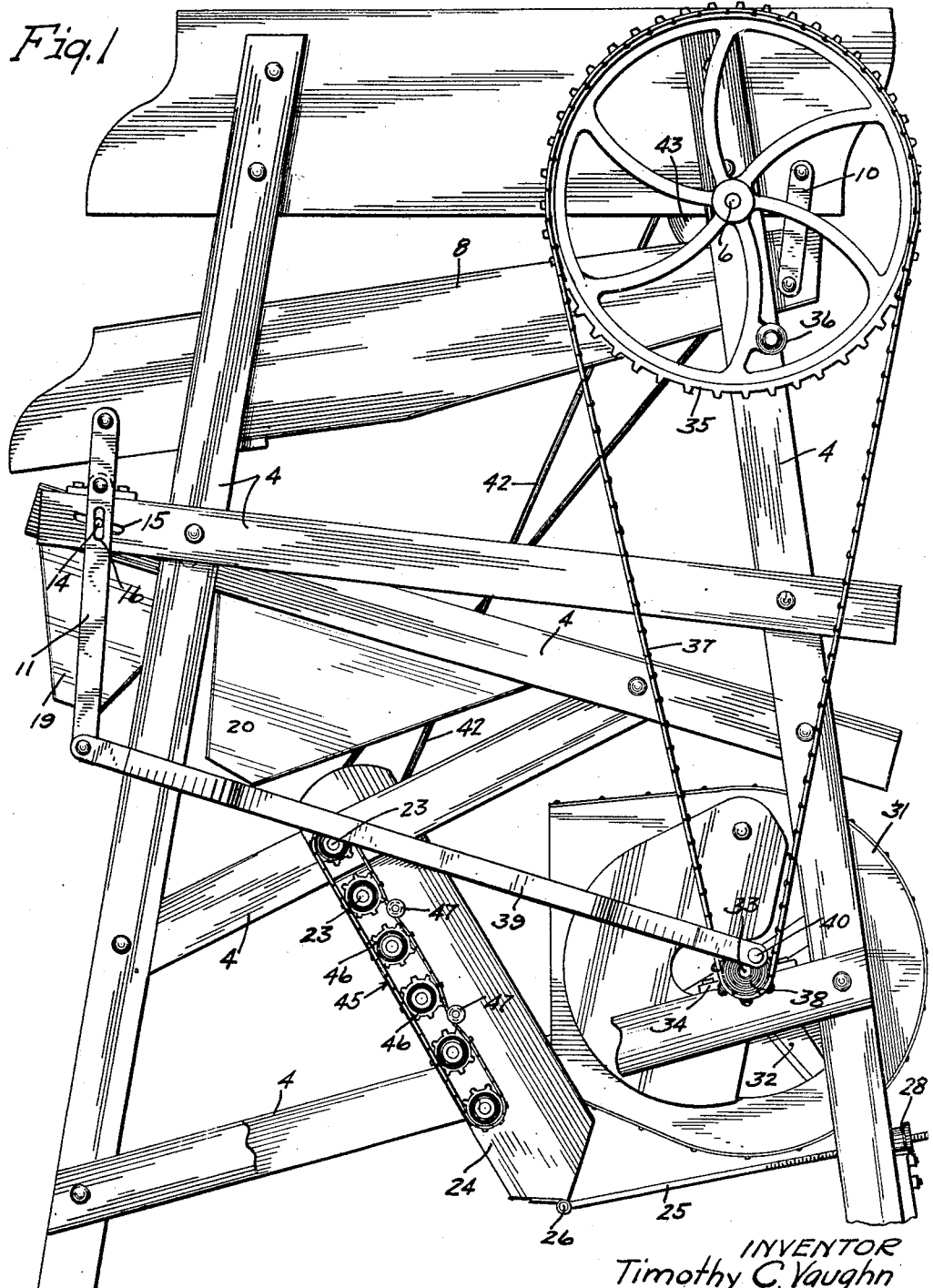

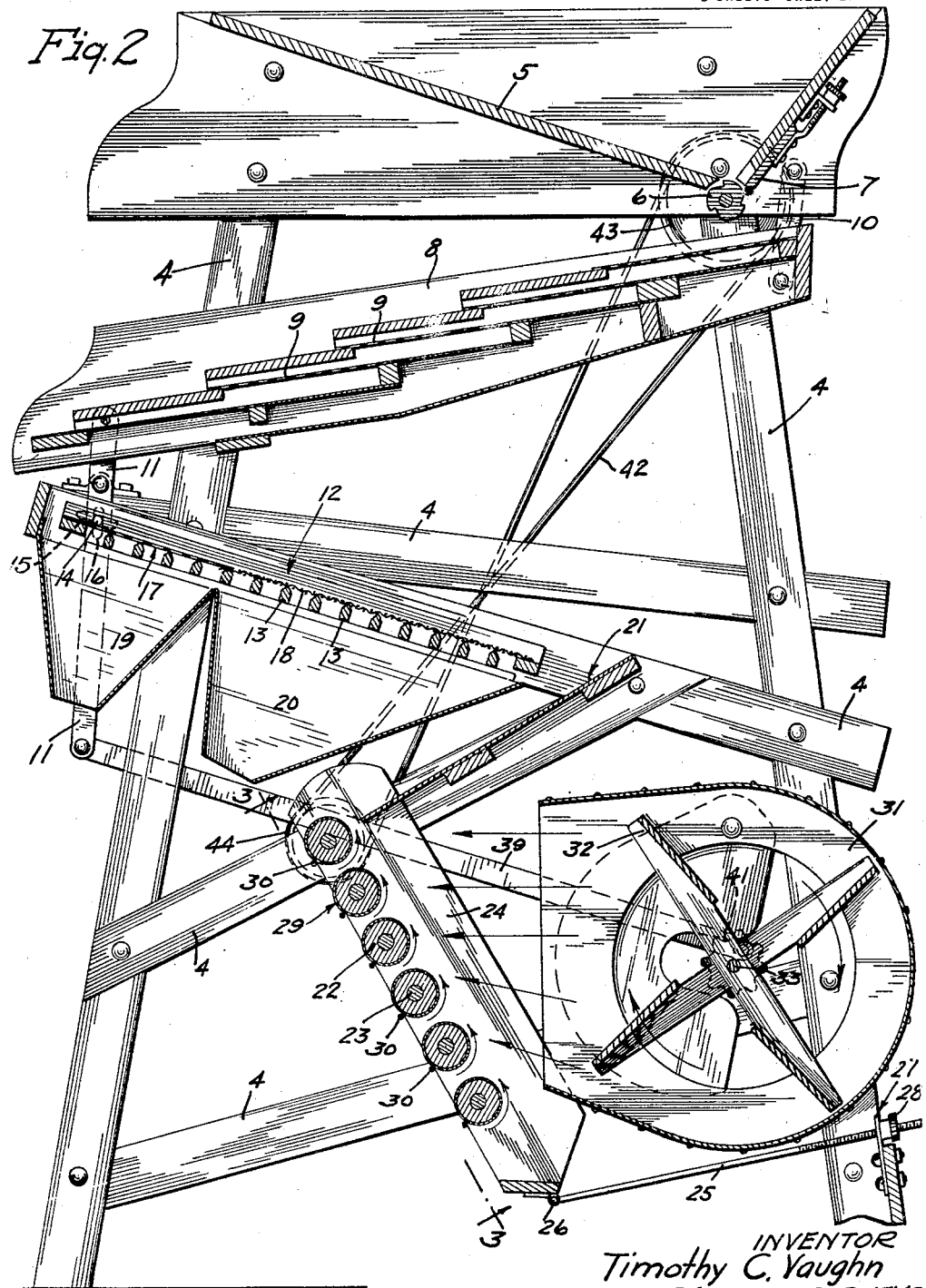

UNITED STATES PATENT OFFICE.

TIMOTHY CHARLES VAUGHN, OF MORRIS, MINNESOTA.

GRAIN-SEPARATOR.

1,325,219.  Specification of Letters Patent.  Patented Dec. 16, 1919.

Application filed June 23, 1919. Serial No. 305,999.

*To all whom it may concern:*

Be it known that I, TIMOTHY CHARLES VAUGHN, a citizen of the United States, residing at Morris, in the county of Stevens and State of Minnesota, have invented certain new and useful Improvements in Grain-Separators; and I do hereby declare the following to be a full, clear, and exact description of the invention, such as will enable others skilled in the art to which it appertains to make and use the same.

My present invention relates to improvements in grain separators; and, to this end, it consists of the novel devices and combinations of devices hereinafter described and defined in the claims.

In the accompanying drawings, which illustrate the invention, like characters indicate like parts throughout the several views.

Referring to the drawings:—

Figure 1 is a side elevation of the improved grain separator;

Fig. 2 is a longitudinal vertical section; and

Fig. 3 is a detail view of the separating rollers with some parts sectioned on the line 3—3 of Fig. 2.

The numeral 4 indicates the frame of the machine which supports, at its upper end, a hopper 5 having a feed roller 6 and coöperating adjustable feed board 7. Underlying the hopper 5, is an upper shoe 8 which carries a gang of scalping sieves 9. The receiving end of the shoe 8 is suspended from the frame 4 by a pair of links 10 and its delivery end is supported on the upper or short ends of a pair of vertically disposed levers 11 intermediately fulcrumed to the frame 4.

Underlying the shoe 8, is a lower sieve frame inclined in a reverse direction from the gang 9 and supported on a multiplicity of transverse clearing slats 13 carried by the frame 4. The sieve frame 12 is connected to the levers 11, below their fulcrums, by studs 14 secured in the upper end portions of the sides of said frame. To permit the required oscillatory movement of the levers 11, the studs 14 are free to move in horizontal slots 15 in the frame 12 and vertical slots 16 in said levers.

Secured in the upper end portion of the frame 12, is a sieve 17, onto which materials passing through the scalping sieves 9 are precipitated and which sieve 17 is designed to remove from said materials dirt, mustard seed, and the like. In the lower end portion of the frame 12 and forming a continuation of the sieve 17, is a sieve 18 designed to remove screenings from the materials passing over said sieve 17. Secured to the frame 4, are two open bottom hoppers 19 and 20, the former of which underlies the sieve 17 and the latter of which underlies the sieve 20 to receive materials precipitated therethrough. Materials tailed over the sieve 18 are precipitated onto a deck 21 carried by the frame 4 and inclined in a reverse direction from said sieve.

A series of horizontal separating rollers 22, that are vertically spaced, have their shafts 23 journaled in the side members of a supplemental frame 24. This supplemental frame 24 is suspended from horizontal swinging movement from the frame 4 by having the ends of the uppermost shaft 23 journaled in said frame. To adjustably hold the supplemental frame 24 there is provided a rod 25, one end of which is connected by a hinge joint 26 to the lower end of the frame 24 and the other end of which is screw-threaded, inserted through an aperture in a plate 27 secured to the frame 4 and provided with a thumb nut 28, which bears against said plate. Obviously, by adjusting the nut 28 on the rod 25, the operative length of said rod may be varied, at will, to change the inclination of the supplemental frame 24, and hence, the inclination of the operative faces of the entire series of separating rollers 22. Each roller 22 is covered with relatively hard material 29, such as canvas, which tightly fits therearound.

It will be noted that the inclined deck 21 extends at substantially a right angle to the supplemental frame 24 and on a radial line from the uppermost roller 22 with its delivery end spaced apart from said roller. A cleaner 30 is provided for each separating roller 22 and these cleaners, as shown, are in the form of wires having their ends anchored to the suplemental frame 24 and arranged to scrape said rollers throughout their entire length, at points substantially diametrically opposite the operative faces of the rollers 22.

Secured to the frame 4, is a fan casing 31 in which is mounted a fan 32, a shaft 33 of which is journaled in bearings 34 on the frame 4. It will be noted that the throat of the fan casing 31 is of such size as to direct a blast of air from the fan 32 onto the operative faces of the entire series of separating rollers 22, throughout their entire length and between the same.

The driving connections for the improved grain separator are as follows, to wit:—

Secured to one end of the feed roller 6, is a large sprocket wheel 35 having a hand piece 36 by which it may be turned. A sprocket chain 37 runs over the sprocket wheel 35 and a small alined sprocket wheel 38 on the fan shaft 33 for driving the fan from the feed roller 7. The shoe 8 and lower sieve frame 12 are vibrated by oscillating the levers 11 from the fan shaft 33 through pitmen 39 pivotally connected to the lower ends of said levers and to eccentric pins 40 on the sprocket wheel 38 and a like sprocket wheel 41 on the other end of said fan shaft. The upper separating roller 22 is driven from the feed roller 6 by a crossed belt 42 arranged to run over a relatively large grooved pulley 43 on the opposite ends of the shaft of said feed roller and a relatively small grooved pulley 44 on said upper separating roller. All of the other separating rollers 22 are driven in the same direction with the uppermost of said rollers by a sprocket chain 45 arranged to run over alined sprocket wheels 46 on the shafts 33 of the entire series of separating rollers 22. Two guide rollers 47 for the sprocket chain 44 are loosely journaled on the supplemental frame 24.

The operation of the improved grain separator has heretofore been briefly described down to the time the materials tailed over the sieve 18 were precipitated onto the inclined deck 21. The balance of the operation of the machine will be directed to the separation of oats from wheat, but it is, of course, understood that the machine is equally well adapted to make such separation as oats from barley.

All materials delivered onto the deck 21 will slide thereover, under the action of gravity, and against the upwardly moving separating surface of the uppermost roller 22. From this uppermost roller 22, the wheat kernels, owing to their weight and shape, will drop faster and strike harder than the oats, and, when they hit the hard underlying upwardly moving separating surface of the next lowermost roller 22, will bound therefrom and drop onto the separating surface of the next lowermost roller 22, and so on, until the wheat has passed over all of the separating rollers 22. While the wheat kernels are bounding from one separating roller to the other, the fan 32 is delivering a blast of air therethrough and onto and between said rollers. This blast of air, in passing between the rollers 22, takes with it all materials of a light and fluffy nature, such as found in separating grains.

Oats, falling with the wheat from one roller to the other, will, owing to their peculiar shape, tend to fall in an upright position with their heavy ends down, and, in case any of the oats start to fall otherwise, they will aright themselves. It will thus be seen that the sides of the oats are exposed to the blast of air from the fan, which, acting on the large ends thereof, will deflect the oats from the wheat by bringing the small ends of the oats into the wind, and thereby cause the oats to strike the upwardly moving separating surfaces of the roller 22 considerably inward of the roller surfaces on which the wheat strikes. When the oats strike the rollers 22, the wind blast will hold said oats thereon until they have passed between the rollers. After the oats have passed between the rollers 22, the wind blast will remove part thereof from said rollers, others are carried by the rollers out of the path of the wind blast between the rollers, and others clinging to said rollers will be removed therefrom by the cleaners 30.

The wind blast will also remove, with the oats, all shrunken, broken and small kernels of wheat, and, by adjusting the supplemental frame 24 to change the inclination of the separating surfaces of the entire series of rollers 22, the wheat may be graded to any desired extent.

What I claim is:—

1. In a grain separator, the combination with a frame, of a series of rollers having upwardly moving separating surfaces, said rollers being journaled in an oblique line on said frame to bring their separating surfaces into stepped arrangement so as to deliver from the one directly to the other, and a fan having a discharge spout arranged to direct the blast of air from the fan onto the separating surfaces of the rollers and between the same.

2. In a grain separator, the combination with a frame, of a series of rollers having upwardly moving separating surfaces, said rollers being journaled in an oblique line on said frame to bring their separating surfaces into stepped arrangement so as to deliver from the one directly to the other and having yielding faces, and a fan having a discharge spout arranged to direct the blast of air from the fan onto the separating surfaces of the rollers and between the same.

3. In a grain separator, the combination with a frame, of a series of rollers having upwardly moving separating surfaces, said rollers being journaled in an oblique line on said frame to bring their separating surfaces into stepped arrangement so as to deliver from the one directly to the other, means for adjusting the frame to change the inclination of the oblique line on which the rollers are journaled, and a fan having a discharge spout arranged to direct the blast of air from the fan onto the separating surfaces of the rollers and between the same.

In testimony whereof I affix my signature in presence of two witnesses.

TIMOTHY CHARLES VAUGHN.

Witnesses:
    WINIFRED WARD,
    HARRY D. KILGORE.